United States Patent [19]

Michener

[11] Patent Number: 4,470,064

[45] Date of Patent: Sep. 4, 1984

[54] HORIZONTAL SYNC TO SUBCARRIER PHASE MEASUREMENT METHOD AND APPARATUS

[75] Inventor: James A. Michener, Grass Valley, Calif.

[73] Assignee: The Grass Valley Group, Inc., Grass Valley, Calif.

[21] Appl. No.: 364,154

[22] Filed: Mar. 31, 1982

[51] Int. Cl.³ ............................................... H04N 9/62
[52] U.S. Cl. ...................................................... 358/10
[58] Field of Search ........................... 358/10, 139, 19; 324/83 A, 88; 328/133

[56] References Cited

U.S. PATENT DOCUMENTS

| | | | |
|---|---|---|---|
| 3,958,269 | 5/1976 | Davis | 358/10 |
| 4,024,571 | 5/1977 | Dischert | 358/19 |
| 4,180,829 | 12/1979 | Pires | 358/10 |
| 4,388,637 | 6/1983 | Blair | 358/10 |

Primary Examiner—Michael A. Masinick
Attorney, Agent, or Firm—John Smith-Hill

[57] ABSTRACT

The 50% point of the leading edge of sync is used to acquire the value of a color burst locked CW carrier, and a quadrature color burst locked CW carrier. The acquired value of each of the two carriers are split into two values representing the value on alternating horizontal lines. This requires the generation of a one-half horizontal rate signal (H/2) which can have an arbitrary phase relationship. The H/2 phase is associated with each of the four acquired CW carrier values and that information is used by the computing device. The H/2 signal is also used to gate a 30 Hz vertical frame pulse to enerate a 15 Hz V1 color frame pulse. The computing device receives the color frame pulse and records the time the pulse occurs. This information represents the minimum and sufficient set of data to obtain a complete measure of sync to subcarrier phase (SC/H) and color frame comparison. By multiplexing the acquisition electronics between two video sources, SC/H and color frame comparisons can be made by the computing device.

22 Claims, 5 Drawing Figures

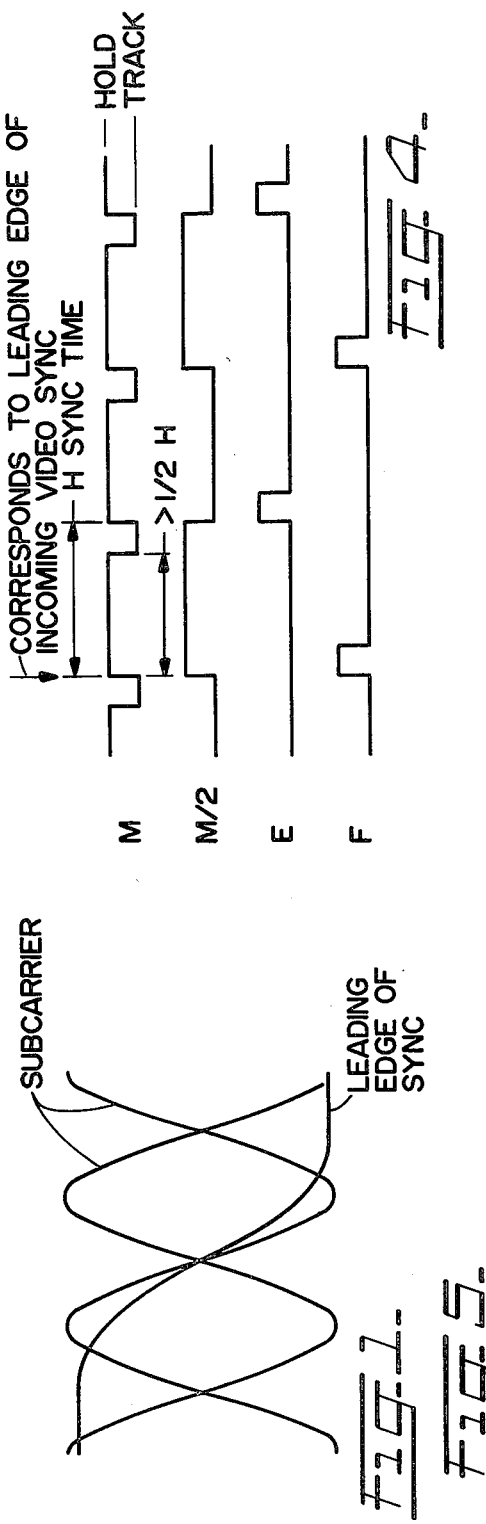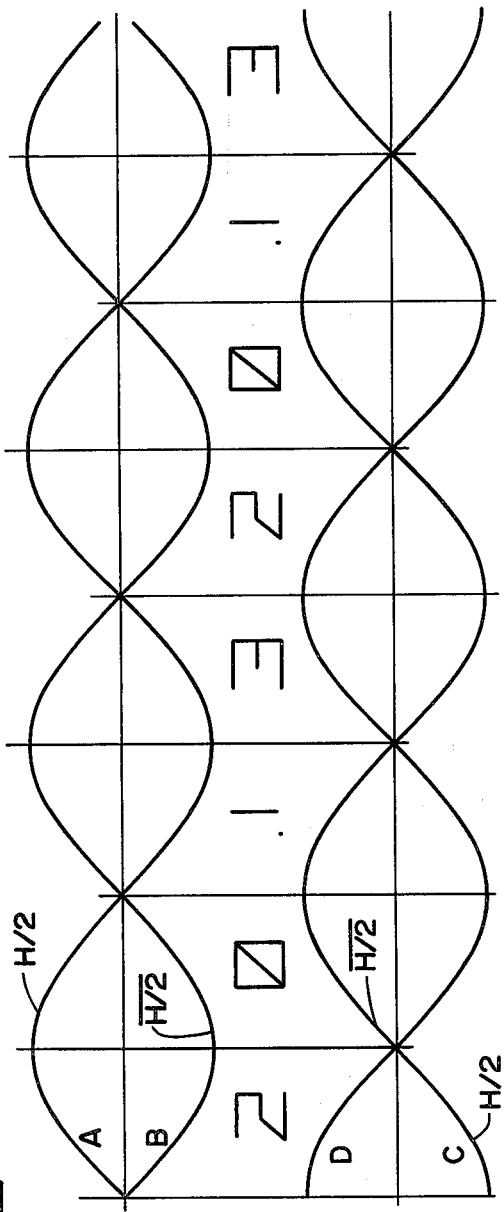

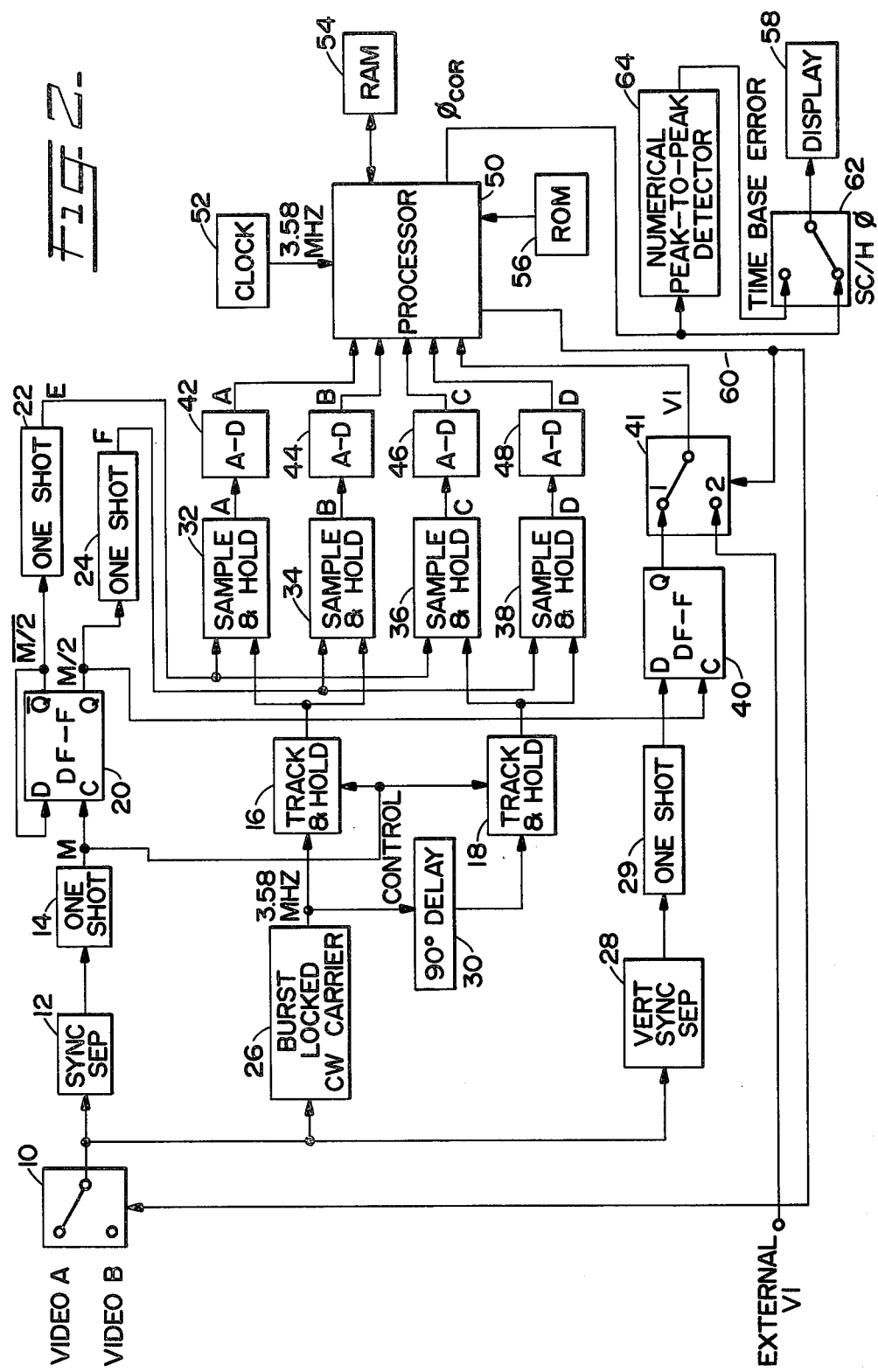

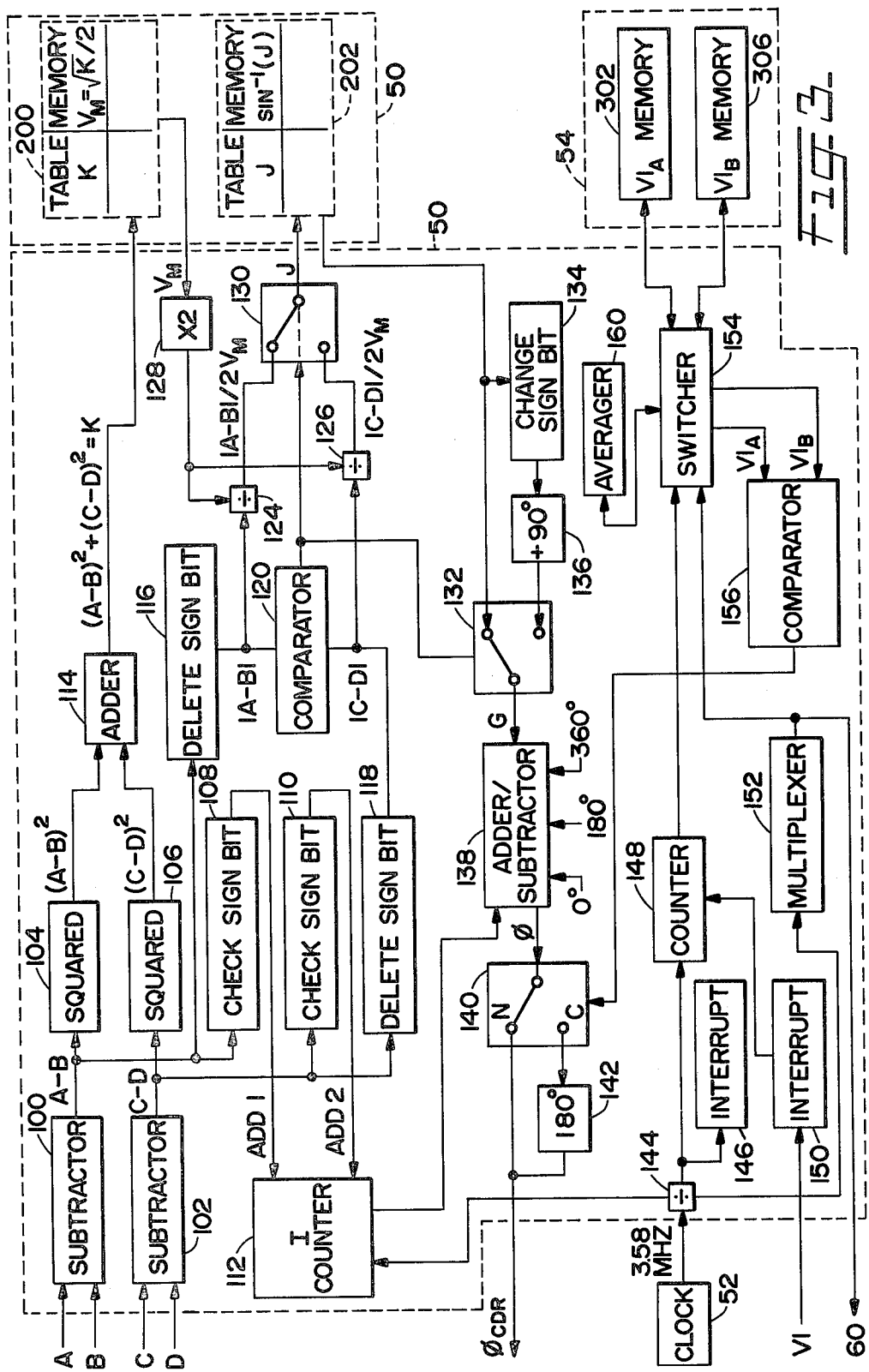

HORIZONTAL SYNC TO SUBCARRIER PHASE MEASUREMENT METHOD AND APPARATUS

BACKGROUND OF THE INVENTION

This inventions is related to the measuring of complex signal internal relationships, more particularly, to measuring the horizontal sync pulse to subcarrier phase relationship of video signals.

Video signals are a composite of various pulses and selectively superimposed subcarrier signals. One element of these signals is a series of sync pulses of which there are two types—vertical and horizontal. Vertical sync pulses are broad pulses which occur every so many lines to trigger the TV (television) to go from the bottom of the picture to the top. The horizontal sync pulse is the trigger which resets the scan to the left side of the picture after each horizontal line is completed.

In the U.S. there are 525 lines in a TV picture. These are divided into two interlaced fields with one-half of the lines being scanned in the first field and the other half of the lines being scanned in the second field. In each field 262.5 lines are painted on the screen with one-half line at the end of the first field and one-half line at the beginning of the second field. Thus, to complete a single picture, two fields are necessary and the paired fields are called frames.

This relationship was defined by the EIA (Electronic Industries Association) in standard RS-170 in the 1940's. As defined therein, the frame repetition rate is 30 Hz.

Next following the horizontal sync pulse in the video signal is a subcarrier reference color burst. The burst is followed by an analog signal varying from the black to white level with color information thereon in phase modulated side bands of the superimposed subcarrier signal.

In recent years EIA has proposed a color standard, RS-170A wherein the relationship between horizontal sync and the subcarrier is specified. In RS-170A the subcarrier frequency has been selected to be 3.579545 MHz and the horizontal scanning frequency is defined to be $$H = (2 \cdot SC/455) \quad (1)$$

where H is the horizontal sync frequency and SC is the subcarrier frequency stated above.

As a result of this definition and the fact that there are 525 lines per frame, there are 227.5 cycles of subcarrier per line resulting in the phase of the subcarrier alternating every line. Additionally, there are 119437.5 cycles of subcarrier per frame. Therefore, because of the extra half cycle of subcarrier per frame, it takes two frames to complete a color sequence.

Also, because of the relationship of equation 1, the horizontal sync frequency is locked to the subcarrier frequency, but this does not define the phase relationship of the sync and subcarrier signals. RS-170A defines the phase relationship between these two signals as being in phase when the zero crossing of the extrapolated subcarrier of burst aligns with the fifty percent point of the leading edge of sync as shown in FIG. 1. This definition of horizontal sync (H) to subcarrier (SC) phase (SC/H phase) is required for the unambiguous identification of the four field sequence (color frame) where a color frame consists of a pair of two field frames.

The SC/H phasing is important for two reasons, first because of the possible future adoption of RS-170A by the FCC and secondly in the video tape environment. A video tape machine in a normal synchronized playback mode, where the machine locks to house sync (studio master timing clock generator), has a sequence of three steps to achieve lock. First, the machine frame locks by aligning a control track frame pulse with a frame pulse derived from house sync. There are two control track frame pulses per color sequence on the first field to each frame. The second step is locking horizontal sync to the house reference. Third, to lock is the color time base corrector, in order to make the subcarrier correct, the horizontal phase of tape sync must be moved with respect to the house reference. This error can be as great as 140 ns, or one-half cycle of subcarrier. The case of 140 ns error implies that the video on the tape is of the other color field as compared to house reference. Due to the necessity of this locking sequence the tape machine makes frame assignment between house and tape sync first without regard to the correct frame in the color sequence. On playback mode there are even odds that the machine will lock to the incorrect frame. Under this condition, sync, that is on the tape, will be 140 ns (half a subcarrier cycle) out of time with house sync. This will result in a shrinking of active picture and a widening of horizontal blanking width since the output processor of the tape machine is inserting blanking referenced to house sync. Some tape machines have a color framer, which essentially adds a fourth step in the locking sequence. If upon horizontal lock the horizontal phase error between tape video and input video is greater than 70 ns, the machine will assume it is locked to the incorrect frame, and will shift frames and again complete the locking sequence. One disadvantage with color frame lock is that it can take twice as long to lock. A different approach is with a 15 Hz framer. When video is recorded on the tape only every other frame pulse is recorded, thus when the tape is moved from one tape machine to another, the relationship between the frame pulse on the control track and the house color frame is lost.

This horizontal shifting becomes critical in a tape editing environment especially while editing scenes together of similar content. During the edit the similar background will appear to jump horizontally. A specific example of this is in animiation where several items are to be popped on or off the screen against the same background.

To insure the proper operation of the tape machine color framer, the SC/H phase relationship of the video recorded on tape, and that of house sync and subcarrier must be matched. For uniformity, correct SC/H phase is defined by RS-170A. It is therefore best for all video recorded on tape to have a consistantly correct SC/H phase relationship, and the input video to the tape machine also to be stable and to have correct SC/H phase.

The concept of timing a studio for subcarrier is well understood in the industry, but timing a house for both sync and subcarrier requires a new level of thought regarding each element within a studio. First and most obvious is the house sync generator. If the sync generator cannot generate consistant SC/H phased signals, there is no way to SC/H phase a plant. It is equally important in a multiple sync generator plant, that all generators maintain the SC/H and color frame relationships. Once SC/H phase has been defined by the sync generator all other elements in the system should not alter the SC/H phase relationship. This implies many things. Some obvious elements are processors, which regenerate sync and burst. If the phase of the regenerated sync or burst is different from the incoming video, the SC/H phase will be altered. Less obvious are sources which derive timing from externally applied sync and subcarrier. If these pulses are fanned out through DAs, then both sync and subcarrier timing can be altered independently. This implies that the output of each source must be timed for both sync and subcarrier to the input of the switcher.

There are many distortions which make difficult the determination of color frame and SC/H phase. First is sync to subcarrier time base errors. This can be generated by many elements, such as sync generators with noise in their horizontal sync circuits, linear and regenerative pulse DAs which suffer from pick off jitter or low frequency response problems, or any processor or source equipment that can effect the sync to subcarrier phase relationship.

There are also problems in signal transmission, such as noise which makes the determination of the exact fifty percent point of sync difficult, or low frequency response problems creating smear, which creates distortions to the leading edge of sync. Lastly, is hum or power line glitches which are not removed prior to sync separation.

The sync to subcarrier time base error is different than the entire video time base error. Sync to subcarrier time base error may be checked by triggering a scope on the 50 percent point of the leading edge of sync, and viewing the burst. What should be seen are two overlapping cycles of subcarrier which are not blurred.

If sync to subcarrier time base error occurs either on the reference pulses to a tape machine or exists on the video recorded on the tape, it makes color frame lock difficult. In the normal synchronized lock mode, if either time base error condition is excessive, the tape machine will shift horizontal lines by 279 ns (one subcarrier cycle) increments. This phenomenon is seen as a tearing of the picture.

To achieve an SC/H phased plant, the timing of sync becomes as important as subcarrier, and each element should be viewed in that light. To aid video tape editing, it is important to record video with proper SC/H phase and also supply SC/H phased video to the machine in playback.

The measurement of SC/H phase is not a simple proposition without a specialized instrument. To do so one needs the following equipment as well as a good working knowledge of what one is looking at and for:

| | |
|---|---|
| Dual Trace Oscilloscope (with delayed sweep and one channel input inversion) | Tektronix 465 or equivalent |
| Switchable Delay Line | Matthey 511 or equivalent |
| -or- | |
| Continuously Rotatable Subcarrier (360 degree phase) | GVG (Grass Valley Group) 3407 DA or equivalent |

There are two units on the market currently which attempt to measure the SC/H phase but for various reasons fall short of doing a complete job.

One such unit is manufactured by Leitch which has a resolution of approximately 9°. However, this unit utilizes only a single video input signal which makes it impossible for the unit to do a color frame comparison to insure that the color fields are also properly aligned.

The second unit is manufactured by Lenco. This unit utilizes two video input signals which enables it to measure SC/H phase, as well as, do a color frame comparison. However, this unit requires that the two video input signals be applied at exactly the same time which dictates complex circuitry to provide the desired result. This unit is expensive and extremely hardware intensive.

What is needed is a reliable, simple, easy to use piece of equipment which not only measures SC/H phase, but also addresses the color frame comparison issue to insure the quality of the video signal throughout the house system without the requirement that the input video signals be pre-timed, one with respect to the other. It is believed that the current invention provides such an instrument.

SUMMARY OF THE INVENTION

The present invention is a method and apparatus for measuring and displaying the SC/H phase of a selected video signal. That measurement is also corrected for the occurrence of the color frame pulse in the third field instead of the first field of the color frame by a comparison of the color frame pulse of the selected video signal with the color frame pulse from a second video signal or the house color frame pulse. In addition, the invention includes the measurement of the SC/H time base error and the generation of an error signal when the format of the selected video signal is non-standard.

The illustrated embodiments of the invention, in response to the application of the selected video signal to be measured, generates a sync window signal having the sync pulses inhibited for a period greater than one-half the horizontal sync period and the horizontal sync period. From the sync window pulse, two complementary signals each having a repetition rate substantially equal to half the horizontal sync rate are generated. In response to the sync window signal, the two complementary signals and the selected video signal, four sampled sine wave signals are generated. These four sampled sine wave signals are in quadrature phase with each other and of the same frequency as the subcarrier frequency. The value of each of the four sine wave signals is measured at the occurrence of the leading edge of the sync window signal.

Next the average peak values of the four sine wave signals is determined and the phase of one of these four signals is selected as the reference phase for the measurement of the SC/H phase of the selected video signal. From the measured values of the four sine wave signals the quadrant, with respect to the selected phase, in which the leading edge of the sync window signal occurs is determined. The phase relationship of the leading edge of the sync window signal to the nearest zero crossing of the four sine wave signals is determined utilizing the measured values of the four sine wave signals and the average peak value of the four sine waves. That phase relationship is then adjusted for the quadrant in which the sync window signal occur to yield the phase relationship to the selected zero phase.

To determine if the correct color frame reference pulse has been selected and the correct phase measurement as measured above, a color frame reference pulse within the window of one of two complementary signals generated in response to the sync window signal is derived from the selected video signal. The time of receipt of the color frame reference pulse is measured against a free running clock and that measurement is stored. The same measurement is made of a color frame pulse from an independent source. Comparison is then made of these two times of receipt, if these are substantially different, then the phase relationship determined above is adjusted by 180°.

To determine the SC/H time base error, the minimum and maximum phase measurements are detected. By taking the difference between the minimum and maximum phase values the SC/H time base error is obtained.

DESCRIPTION OF THE DRAWINGS

FIG. 1 is a representation of the subcarrier signal superimposed on the leading edge of the horizontal sync signal which defines the 0° phase relationship between the two signals.

FIG. 2 is a block diagram of one embodiment of an SC/H phase measurement circuit constructed according to the principles of the invention.

FIG. 3 is a block diagram of a second embodiment of portions of the circuit of FIG. 1 also constructed according to the principles of the invention.

FIG. 4 is a timing diagram showing the representative alignment of selected signals.

FIG. 5 shows the phase relationships between sampled subcarrier signals A, B, C, and D of the present invention.

DESCRIPTION OF THE PREFERRED EMBODIMENT

Referring now to FIG. 2 there is shown one embodiment of the invention. A pair of input ports are provided for receiving two input video signals. These ports are shown as the two selectable terminals of SPDT switch 10.

Next, a gate signal M to be used to gate track and hold circuits 16 and 18 is generated. The desired signal is generated by a sync window circuit wherein the sync pulses from the incoming video signal are inhibited for a period of time greater than 31.5μ sec (H/2 period) and less than 63μ sec (H period). After this period of time, the sync window opens up, and the next sync pulse goes low and the window again closes. This is necessary to supress the vertical sync information which occurs at twice the horizontal sync rate.

The Sync Separator 12 (e.g., GVG 3252A) and edge triggered one shot 14 perform the function of the sync window circuit. Returning to FIG. 2, the selected video signal is applied to sync separator 12, via switch 10, with its output coupled to an edge triggered one shot 14 to create the gate signal, M (FIG. 4). Signal M has a rep rate of 63μ sec (horizontal sync rep rate) or H sync time. M is divided by 2 by D flip-flop 20. It is important to note that the M/2 signal created here is of arbitrary phase with respect to the subcarrier. The signals M/2 (FIG. 4) and M/2 are applied to edge triggered one shots 22 and 24 to create signals E and F, respectively (FIG. 4).

The selected video signal is also applied to a burst locked CW carrier 26 and a vertical sync separator 28 (both these functions can also be provided by a GVG 3252A Sync Generator System). The function of the burst locked CW carrier 26 is to lock its crystal oscillator to the burst signal of the selected video to provide a CW (continuous wave) subcarrier signal.

Each of track and holds 16 and 18 is designed to track the subcarrier signal from 26 while the sync gate is open (M is low). At the leading edge of sync, each of track and holds 16 and 18 switches into the hold mode, holding the amplitude value of the CW carrier at that point in time. The CW carrier signal is applied directly to track and hold 16 and the CW carrier delayed by 90° is applied to track and hold 18 via delay 30.

The output of track and hold 16 is applied to sample and holds 32 and 34 which are triggered by E and F, respectively, to create the sample values of subcarrier A and B. A and B represent the values of the sampled value of subcarrier on alternate lines.

The output of track and hold 18 is similarly applied to sample and holds 36 and 38 to create the sample values of subcarrier C and D. Since the output of track and hold 18 is delayed by 90° from that of track and hold 16, and since sample and holds 36 and 38 are triggered with E and F, respectively, C and D represent the values of the 90° phase shifted subcarrier on alternate video lines.

FIG. 5 shows the relationship of signals, A, B, C and D with respect to each other. B is delayed by 180° from A, and D and C, respectively, are delayed 90° from A and B, respectively. For convenience, signals A, B, C and D will be referred to as being in quadrature phase, i.e. D is delayed by 90° from A, B is delayed 90° from D, C is delayed 90° from B, and A is delayed 90° from C. Mathematically, these signals are related as follows:

$$A = Vm \sin(\phi) \qquad (2)$$

$$B = -Vm \sin(\phi)$$

$$C = -Vm \cos(\phi)$$

$$D = Vm \cos(\phi)$$

where $\phi$ is the sync to subcarrier phase, and Vm is the peak amplitude of the sine wave.

Via this approach, all the information required can be derived. First, the value Vm, the peak value of the sine wave can be determined as follows:

$$Vm = \frac{\sqrt{(A-B)^2 + (C-D)^2}}{2} \qquad (3)$$

Using the phase of signal A as the reference phase for measurement, the proper quadrant (FIG. 5) can be determined as follows:

Select $I = 0$, $$\text{If } (A - B) < 0, \text{ then } I = I + 1 \qquad (4)$$

$$\text{If } (C - D) < 0, \text{ then } I = I + 2$$

The final value of I will than represent the quadrant of the reference subcarrier in which the leading edge of sync occurred as indicated in FIG. 5.

The value of the phase within each quadrant can best be determined by finding the arc sine of the sine function nearest to zero as follows:

$$\text{If } |A - B| \leq |C - D| \text{ then} \qquad (5)$$

$$G = \text{arc sine } (|A - B|/(2Vm))$$

$$\text{If } |A - B| > |C - D| \text{ then}$$

-continued $$G = 90° - \arcsin(|C - D|/(2Vm))$$

where G is an intermediate value. Value G then gives the angular displacement within a given quadrant in degrees.

A full 360° determination of SC/H phase error ($\phi$) can be determined by the following:

If $I = 2$, then $\phi = G$     (6)

If $I = 0$, then $\phi = 180° - G$

If $I = 1$, then $\phi = 180° + G$

If $I = 3$, then $\phi = 360° - G$

Now a full 360° measurement only has meaning if there is a color frame reference available.

The color frame reference needed to make the final SC/H phase determined can be derived from the applied video signal or from an external color frame reference generator. With switch 41 in position 1, the output of vertical sync separator 28 is applied to a leading edge one shot 29, the output of which is applied to D flip-flop 40 which is clocked by M/2 from D flip-flop 20. This color frame reference is labelled V1. However, since the M/2 signal is of arbitrary phase with respect to the subcarrier, V1 may correspond to either the first or third field in the four field color sequence. Thus, V1 is either coincident with the color frame pulse of the house standard to which the selected video signal is to be synchronized or it is 180° out of phase and occurs on the opposite color frame. To make this determination, the occurrence of V1 and the color frame pulse of the house standard are timed against the same clock. If the two occur at approximately the same time, $\phi$ calculated as above is correct, otherwise $\phi$ must be corrected by 180°.

The balance of the circuit of FIG. 2 consists of A-D converters 42, 44, 46 and 48 for digitizing A, B, C and D. A processor 50 (e.g. an 8085 microprocessor) is shown having A, B, C, D and V1 as input signals. Processor 50 is under control of clock 52 for timing its internal operations. Also coupled to processor 50 is RAM 54 for storing and recalling calculation values therein and therefrom, ROM 56 for storing the program steps for processor 50 and look-up tables for the square root and arc sine calculations, manual mode switch 62 for operator selection between SC/H $\phi$ and TBE modes, and display 58 to provide the result to the operator.

Processor 50 operates on A, B, C and D in the order of equations 3-6 to obtain $\phi$ and then it performs the color frame comparison as discussed below. Internal to processor 50 an interrupt signal is generated from clock 52 which interrupts the operation of processor 50 at a rep rate which is 16 times the rep rate of the 15 Hz V1 pulse train.

Each time processor 50 is interrupted by this pulse, it increments a location in memory (RAM 54). The V1 pulse also interrupts processor 50. Each time the V1 interrupt is serviced, processor 50 reads the counter being incremented by its timer with the last four counter values being stored in an array in RAM 54.

The time of the V1 interrupt with respect to an internal 15 Hz clock pulse derived from clock 52 can be computed and stored. The input can then be switched to the alternate video input by a command from processor 50 via line 50 to switch SPDT switch 10, a new measurement is then made, and the time of the V1 interrupt compared in time with the previous measurement.

Through the use of a free running clock 52, two video input signals can be multiplexed between removing the requirement that a proper H/2 or V1 color frame identification be done.

By recording the times of each V1 interrupt, a positive indication of video presence can be calculated by processor 50. If four V1 pulses have not been received, each of which is separated by 16 counter pulses, then the input source cannot be valid video.

To improve the results obtained by such a system a number of calculated values of $\phi$ can be averaged to provide a high degree of noise immunity.

FIG. 3 shows a second embodiment for processor 50, ROM 56 and RAM 54. The digitized sine waves A, B, C and D are applied in pairs to subtractors 100 and 102 with the outputs representing A-B and C-D, respectively. Each of these values are in turn applied to squarers 104 and 106, respectively, producing the digital signals representative of $(A-B)^2$ and $(C-D)^2$. Next, these signals are added by adder 114 and the resultant signal is labelled K which is representative of $(A-B)^2+(C-D)^2$. K is then applied to look-up table 200 in ROM 56 to provide a signal which corresponds to $\sqrt{K}/2$ which is Vm, the average peak value of sine waves A, B, C and D.

At the outset of the measurement of the SC/H phase of the applied video signal, clock 52 via divider 144 resets to 0 the I value in I counter 112. The sign bits of the A-B and C-D signals are also checked by 108 and 110, respectively, with the value of I being incremented by 1 if A-B is negative (sign bit present) and being incremented by 2 if C-D is negative. The value of I indicates in which quadrant, as shown in FIG. 5, the leading edge of sync of the video input signal occurs.

The next step is to determine the intermediate value, G, of equations 5. This is done by first removing the sign bits, if any, of signals A-B and C-D to create $|A-B|$ and $|C-D|$. These signals are then compared by comparator 120. Also, each of these signals is divided by 2 Vm, where this signal is the result of applying Vm to multiplier 128, which is applied to dividers 124 and 126. Switches 130 and 132 are controlled by comparator 120 and are both shown in the position for the condition $|A-B| \leq |C-D|$. That is, if $|A-B| > |C-D|$, then the output of divider 126 becomes J via switch 130, otherwise the output of divider 124 is J. The output of switch 130 is then applied to look-up table 202 in ROM 56 with the digital signal corresponding to $\sin^{-1}(J)$ being provided and reapplied to processor 50 at switch 132 and sign bit change 134. For the condition stated above to place switch 132 in the position shown, $G = \sin^{-1}(J)$ and is applied to Adder/Subtractor 138, otherwise $\sin^{-1}(J)$ has its sign bit changed at 134 and 90° added to that value by adder 136 to form G. G represents an intermediate value which is the angular phase displacement within a particular quadrant.

Next, a signal corresponding to $\phi$, the SC/H phase value uncorrected as to color frame location of V1, is generated by Adder/Subtractor 138. In addition to G, a signal representative of the value of I is applied to Adder/Subtractor 138. In this circuit G is added to 0° or 180°, or the value of G subtracted from 180° or 360°, depending on the value or I, to generate a signal representative of $\phi$ as shown in equation 6.

The last step is to determine whether V1 of the video signal under test occurs on the first or the third field of the color frame. To accomplish this, the output frequency of clock 52 is divided by divider 144 by a factor of 14930. The output of divider 144 is then applied to interrupt circuit 146 to interrupt the operation of processor 50 239.75 times per second (240 Hz). This interrupt rate is 16 times the 15 Hz V1 rate (vertical sync rate). The output of divider 144 is also applied to counter 148 to count the number of 240 Hz pulses.

Since switch 10 of FIG. 2 is set to receive Video A, the V1 pulse derived from Video A is applied to interrupt 150 causing an interrupt of processor 50 when it is received. The output of interrupt 150 causes counter 148 to transfer its count to the $V1_A$ memory array 302 in RAM 54 via switches 154. The signal from interrupt 150 also resets counter 148. This continues until the desired number of counter values (e.g. four) are transferred to $V1_A$ memory 302. When four values are stored in $V1_A$ memory 302, they are recalled to averager 160 via switcher 154 and then $V1_A$ ave. is restored in $V1_A$ memory 302. Additionally, each value from counter 148 which is stored in $V1_A$ memory 302 causes the oldest value to be last.

After the desired number of values are stored in memory, multiplexer 152, in response to clock 52 via divider 144, switches switch 10 to input Video B, or switch 41 to External V1 if the operator has selected the vertical sync standard to be used instead of a second video signal, and switcher 154 to address $V1_B$ memory 306 instead of the $V1_A$ memory 320. The V1 now being received by processor 50 undergoes the same measurement as $V1_A$ described above with the results being stored in RAM 54 at memory location 306.

Finally, the values of $V1_{A\ average}$ and $V1_{B\ average}$ are called up from memory locations 302 and 306 and applied to comparator 156 via switcher 154. If those values are close then no adjustment of $\phi$ is necessary and switch 140, under control of comparator 156, will be placed in the N position shown with $$\phi_{cor.}=\phi \qquad (7)$$

If the values of $V1_{A\ average}$ and $V1_{B\ average}$ are greatly different in value then an adjustment of 180° is necessary to correct $\phi$. To accomplish this comparator 156 causes switch 140 to switch to the C position with $$\phi_{cor.}=\phi\pm 180° \qquad (8)$$

This value is displayed on display 58 (FIG. 2) if switch 62 is in the SC/H $\phi$ position.

If the operator has selected the time base error mode by means of switch 62 (FIG. 2), then numerical peak-to-peak detector 64 is of interest. The input to detector 64 is $\phi_{cor}$. Detector 64 compares the post positive against the most negative values of a selected number of values (e.g. four) to calculate the SC/H time base error. This value is displayed on display 58 (FIG. 2), or, if $\phi_{cor}$ signal is not present, a selected error message will be displayed.

I claim:

1. A method for measuring horizontal sync to subcarrier phase of a video signal comprising the steps of:
   a. receiving a sync window signal from the video signal having the sync pulses of the video signal inhibited for a period greater than one-half the horizontal sync period and less than the horizontal sync period;
   b. generating two complementary signals each having a period substantially equal to twice the horizontal sync period in response to the signal received in step a;
   c. receiving a cw carrier signal having its phase locked to the burst of the video signal;
   d. generating four sampled sine wave signals in quadrature phase, each having the same frequency as the subcarrier, from the signals of steps a, b, and c;
   e. measuring the value of each of the four sine wave signals of step d at the occurrence of the leading edge of the sync window signal of step a; and
   f. calculating the horizontal sync to subcarrier phase from the four measured values of step e.

2. A method as in claim 1 further comprising the steps of:
   s. detecting the minimum and maximum values of step f phase values generated by repeating steps a through f a selected number of times; and
   t. generating the sync to subcarrier time base error by taking the difference between the values detected in step s.

3. A method as in claim 1 wherein step f includes the steps of:
   g. determining the average peak value of the four sampled sine wave signals of step d;
   h. selecting the phase of one of the four sine wave signals of step d as the reference phase;
   i. determining the quadrant in which the values of step e occur with relation to the selected phase relationship of step h;
   j. determining the phase relationship of the leading edge of the sync window signal to the nearest zero crossing of the four sine wave signals of step d in the quadrant determined in step i in response of the four measured values of step e and the value of step g; and
   k. adjusting the phase value of step j for the quadrant identified in step i to provide a measure of the phase lag from the reference phase selected in step h.

4. A method as in claim 2 further including the steps of:
   l. receiving a color frame reference pulse of the video signal;
   m. measuring the time of receipt of the pulse of step l against a selected free-running clock;
   n. storing the measured value of step m;
   o. measuring the time of receipt of a color frame pulse from an independent source against the clock of step m;
   p. storing the measured value of step o;
   q. comparing the stored values of steps n and p; and
   r. correcting the phase value of step k by 180° when the compared time values are substantially different.

5. A method as in claim 4 further comprising the steps of:
   u. detecting the minimum and maximum values of step m phase values by repeating steps a through r a selected number of times; and
   v. calculating the sync to subcarrier time base error by taking the difference between the values detected in step u.

6. A method as in claim 5 further comprising the step of displaying the result of step v.

7. A method as in claim 4 further comprising the step of displaying the result of step r.

8. A method as in claim 4 wherein step o includes the measuring and storing the time of receipt of a color frame pulse from a studio video standard.

9. A method as in claim 3 further comprising the steps of:
   ad. detecting the minimum and maximum values of step k phase values generated by repeating steps a through k a selected number of times; and
   ae. generating the sync to subcarrier time base error by taking the difference between the values detected in step ad.

10. A method as in claim 1, wherein step b includes the steps of:
   w. dividing the frequency of the signal of step a by two;
   x. generating a square wave signal of arbitrary phase to the subcarrier in response to the signal of step w; and
   y. generating a complementary signal to the signal of step x.

11. A method as in claim 1 or 10, wherein step c includes the steps of:
   z. receiving a continuous wave carrier signal phase locked to the burst of the video signal;
   aa. delaying the signal of step z by 90°;
   ab. tracking each of the signals of steps z and aa, and holding the value of each at the occurrence of the leading edge of the signal of step a; and
   ac. sampling each of the signals of step ab and holding the value of each at the occurrence of the leading edge of each of the signals of step b.

12. An apparatus for measuring horizontal sync to subcarrier phase of a video signal comprising:
   first means for receiving a sync window signal of the video signal having the sync pulses of the video signal inhibited for a period greater than one-half the horizontal sync period and less than the horizontal sync period;
   second means coupled to said first means for generating two complementary signals each having a period substantially equal to the twice the horizontal sync period;
   third means for receiving a cw carrier signal having its phase locked to the burst of the video signal;
   fourth means coupled to the first, second and third means for generating four sampled sine wave signals in quadrature phase, each having the same frequency as the subcarrier;
   fifth means for measuring the value of each of the four sine wave signals at the occurrence of the leading edge of the sync window signal;
   calculation means coupled to said fifth means for calculating the horizontal sync to subcarrier phase.

13. An apparatus as in claim 12 further comprising:
   numerical peak-to-peak detector means coupled to the calculation means for detecting the minimum and maximum values of a selected number of phase values; and
   thirteenth means coupled to the detector means for generating a sync to subcarrier time base error from the difference between the peak-to-peak values detected by the detector means.

14. An apparatus as in claim 12 wherein said calculation means includes:

sixth means responsive to the measured values of the four sine waves signals for determining the average peak value of the four sampled sine wave signals;
seventh means responsive to the measured values of the four sine waves for determining the quadrant of the four sine waves in which these values were measured;
eighth means responsive to the measured values of the four sine waves and coupled to the sixth means for determining the phase relationship of the leading edge of the sync window signal to the nearest zero crossing of the four sine wave signals; and
ninth means coupled to the seventh and eighth means for adjusting the phase value of the eighth means for the quadrant in which it occurred to provide a measure of the lag from the zero phase of the preselected one of the said four sine wave signals as the reference.

15. An apparatus as in claim 14 wherein:
the apparatus further includes:
multiplexer means for selecting between two video sources; and
tenth means for receiving a color frame reference pulse of the selected video signal; and
the calculation means further includes:
free-running clock means;
memory means;
eleventh means coupled to the tenth means and the clock means for measuring the time of receipt of the color frame pulse against the free running clock, and for storing the value in the memory means for color frame pulses from two video sources as selected by the multiplexer means; and
twelfth means coupled to memory means and the ninth means for comparing the stored values of the times of receipt of the two color frame pulses and correcting the phase value of the ninth means by 180° when the compared time values are substantially different.

16. An apparatus as in claim 15 further comprising display means coupled to the twelfth means for displaying the phase measurement.

17. An apparatus as in claim 15 further comprising:
numerical peak-to-peak detector means coupled to the twelfth means for detecting the minimum and maximum values of a selected number of phase values; and
fourteenth means coupled to the detector means for calculating the sync to subcarrier time base error from the difference between the peak-to-peak values detected by the detector means.

18. An apparatus as in claim 17 further comprising display means coupled to the fourteenth means for displaying the time base error result.

19. An apparatus as in claim 15 wherein the multiplexer means selects between the video signal being measured and a studio video standard.

20. An apparatus as in claim 14 further comprising:
numerical peak-to-peak detector means coupled to the ninth means for detecting the minimum and maximum values of a selected number of phase values; and
twenty-first means coupled to the detector means for generating a sync to subcarrier time base error from the difference between the peak-to-peak values detected by the detector means.

21. An apparatus as in claim 12 wherein the second means includes:

fifteenth means coupled to the first means for dividing the frequency of the sync window signal by two;

sixteenth means coupled to the fifteenth means for generating a square wave signal of arbitrary phase to the subcarrier; and seventeenth means coupled to the sixteenth means for generating a complementary signal to the square wave signal of the sixteenth means.

22. An apparatus as in claim 12 or 21 wherein the fourth means includes:

eighteenth means coupled to the third means for delaying the cw carrier signal by 90°;

nineteenth means coupled to the third and eighteenth means for tracking each of the cw carrier signals and holding the value of each at the occurrence of the leading edge of the sync window signal; and twentieth means coupled to the second and nineteenth means for sampling each of the two traded and held signals and holding the value of each at the occurrence of the leading edge of each of the signals from the second means.

* * * * *